(12) United States Patent
Moriuchi et al.

(10) Patent No.: US 9,874,634 B1
(45) Date of Patent: Jan. 23, 2018

(54) RADAR APPARATUS

(71) Applicant: FUJITSU TEN LIMITED, Kobe-shi, Hyogo (JP)

(72) Inventors: Takumi Moriuchi, Kobe (JP); Yayoi Nakanishi, Kobe (JP)

(73) Assignee: FUJITSU TEN LIMITED, Kobe-shi (JP)

( * ) Notice: Subject to any disclaimer, the term of this patent is extended or adjusted under 35 U.S.C. 154(b) by 473 days.

(21) Appl. No.: 14/733,526

(22) Filed: Jun. 8, 2015

(30) Foreign Application Priority Data

Jun. 20, 2014 (JP) ................. 2014-126819

(51) Int. Cl.
| | | |
|---|---|---|
| *G01S 13/93* | (2006.01) | |
| *G01S 13/42* | (2006.01) | |
| *G01S 7/41* | (2006.01) | |
| *G01S 13/72* | (2006.01) | |

(52) U.S. Cl.
CPC ............ *G01S 13/931* (2013.01); *G01S 13/42* (2013.01); *G01S 7/412* (2013.01); *G01S 13/726* (2013.01)

(58) Field of Classification Search
CPC ........... G01S 13/931; G01S 2013/9325; G01S 2013/9353; G01S 13/42; G01S 7/412; G01S 13/726
USPC .......................................................... 342/70
See application file for complete search history.

(56) References Cited

U.S. PATENT DOCUMENTS

2015/0175162 A1* 6/2015 Nakadori ................. G01S 7/41
701/96

FOREIGN PATENT DOCUMENTS

| JP | H06-174846 A | 6/1994 |
|---|---|---|
| JP | 2004-205279 A | 7/2004 |
| JP | 2009-271086 A | 11/2009 |
| JP | 2011-247721 A | 12/2011 |

* cited by examiner

*Primary Examiner* — Timothy A Brainard
(74) *Attorney, Agent, or Firm* — Oliff PLC

(57) ABSTRACT

A radar apparatus derives (i) first target information of a first target existing in the transmission range of the transmission wave, the first target being a rear end portion of a vehicle and (ii) second target information of a second target existing in the transmission range of the transmission wave, the second target being a portion of the vehicle other than the rear end portion of the vehicle. The radar apparatus calculates a distance difference between the first target and the second target, and predicts, in a case where the first target information of the first target derived in a previous target information derivation process is not derived in a latest target information derivation process, a position of the first target, using the distance difference and the second target information of the second target derived in the latest target information derivation process.

9 Claims, 14 Drawing Sheets

RADAR APPARATUS

FIELD OF THE INVENTION

The invention relates to signal processing for deriving target information.

DESCRIPTION OF THE BACKGROUND ART

Conventionally, a radar apparatus transmits a transmission wave within a transmission range that is an outside of a vehicle, and then acquires target information of a target, such as a preceding vehicle, by receiving a reflection wave reflected by the target. The target information includes a position and a relative speed of the target. A vehicle control apparatus acquires the target information from the radar apparatus and controls the vehicle based on the target information. Thus, the vehicle control apparatus helps a user drive the vehicle safely and comfortably.

In a case where the preceding vehicle is a relatively tall vehicle, such as a truck, there is a possibility that the radar apparatus receives reflection waves reflected by a rear end portion and other portions of a body of the preceding vehicle. The rear end portion of the body of the preceding vehicle is, for example, a rear bumper thereof. The portion other than the rear end portion of the preceding vehicle is, for example, a bottom (base) portion thereof on which a battery and the like are mounted. In other words, the radar apparatus receives a "direct reflection wave" that is reflected by the rear end portion of the preceding vehicle and that reaches the radar apparatus directly from the rear end portion and also receives a "multipath wave" that reaches the radar apparatus after being reflected by the bottom portion of the preceding vehicle first and then by a road surface.

In a case where a host vehicle is some distance away from the preceding vehicle, the radar apparatus receives the direct reflection wave from the rear end portion of the preceding vehicle and the multipath wave from the bottom portion of the preceding vehicle. Then, the radar apparatus derives target information of targets associated with the reflection and multipath waves and then outputs the target information of the targets to the vehicle control apparatus. The vehicle control apparatus controls the host vehicle based on the target information associated with the rear end portion of the preceding vehicle among the received target information, in order to follow the preceding vehicle because a position of the rear end portion of the preceding vehicle is a closest position to the host vehicle.

However, in a case where the preceding vehicle is the relatively tall vehicle and where the rear end portion of the preceding vehicle is higher than a position of the radar apparatus, the rear end portion of the preceding vehicle sometimes comes out of the transmission range of the transmission wave output by the radar apparatus. Therefore, the radar apparatus does not receive the reflection wave from the rear end portion. In other words, the radar apparatus cannot derive the target information of the rear end portion existing in the closest position to the host vehicle. Therefore, the radar apparatus cannot derive an accurate distance between the host vehicle and the preceding vehicle. As a result, there is a case where the vehicle control apparatus does not control the host vehicle appropriately and there is a possibility that the host vehicle comes into contact with the preceding vehicle.

SUMMARY OF THE INVENTION

According to one aspect of the invention, a radar apparatus receives a reflection wave reflected by a target existing in a transmission range of a transmission wave and derives target information of the target. The radar apparatus includes a signal processor configured to: derive (i) first target information of a first target existing in the transmission range of the transmission wave, the first target being a rear end portion of a vehicle and (ii) second target information of a second target existing in the transmission range of the transmission wave, the second target being a portion of the vehicle other than the rear end portion of the vehicle; calculate a distance difference between the first target and the second target; and predict, in a case where the first target information of the first target derived in a previous target information derivation process is not derived in a latest target information derivation process, a position of the first target, using the distance difference and the second target information of the second target derived in the latest target information derivation process.

Thus, even in a case where the target information of the rear end portion of the preceding vehicle is not derived, the radar apparatus accurately predicts the target information of the rear end portion of the preceding vehicle and outputs to the vehicle control apparatus the target information of an appropriate target that the host vehicle follows.

According to another aspect of the invention, in a case where a speed of a host vehicle having the radar apparatus is at or less than a predetermined speed, the signal processor associates the first target information of the first target with the second target information of the second target, and after associating the first target information of the first target with the second target information of the second target, the signal processor predicts the position of the first target.

Thus, the radar apparatus reduces a processing load of the radar apparatus because the prediction data set of the rear end portion of the preceding vehicle is generated only after the two data sets are associated with each other.

Therefore, an object of the invention is to provide a technology for accurately deriving a position of a rear end portion of a preceding vehicle, based on a portion other than the rear end portion of the preceding vehicle, even in a case where target information of the rear end portion of the preceding vehicle cannot be derived due to a short distance between a host vehicle and the preceding vehicle.

These and other objects, features, aspects and advantages of the invention will become more apparent from the following detailed description of the invention when taken in conjunction with the accompanying drawings.

DESCRIPTION OF THE EMBODIMENTS

An embodiment of the invention is hereinafter described with reference to the drawings.

First Embodiment

1. System Block Diagram

Figure 1:
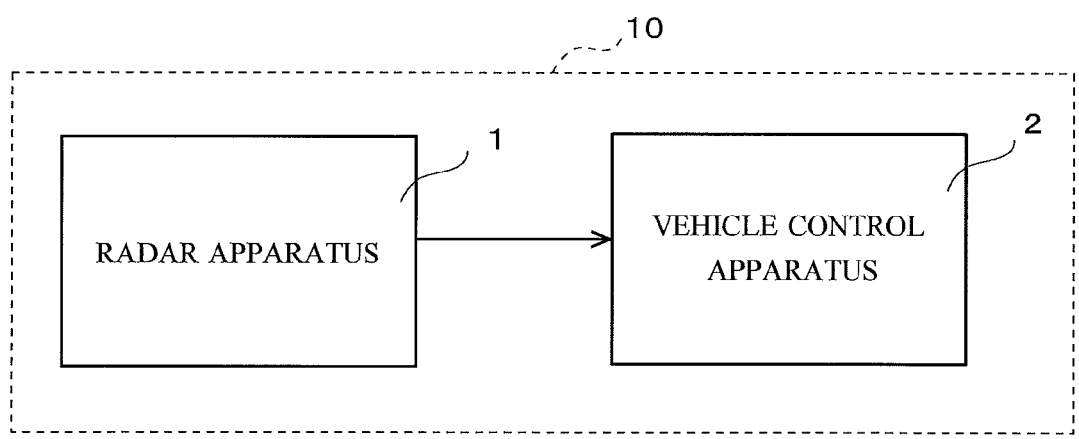
FIG. 1 illustrates a configuration of a vehicle control system in this embodiment.

FIG. 1 illustrates a configuration of a vehicle control system 10 in this embodiment.

The vehicle control system 10 is mounted on a vehicle, such as a car. The vehicle on which the vehicle control system 10 is mounted is hereinafter referred to as "host vehicle." Moreover, a traveling direction in which the host vehicle is traveling is referred to as "front direction" and a direction opposite to the traveling direction is referred to as "back direction." As shown in FIG. 1, the vehicle control system 10 includes a radar apparatus 1 and a vehicle control apparatus 2.

The radar apparatus 1 in this embodiment derives target information of a target, such as a moving object and a stationary object, near the host vehicle, using FM-CW (Frequency Modulated Continuous Wave). Herein, the term "moving object" means an object that is moving at a speed and that has a relative speed different from a speed of the host vehicle (hereinafter referred to as "host vehicle speed"). Moreover, the term "stationary objet" means an object that has a relative speed substantially same as the host vehicle speed.

The target information includes, for example, a longitudinal distance, a relative speed, and a lateral distance of the target. The longitudinal distance (m) is a traveling distance of a reflection wave from the target to a point where the reflection wave is received by a receiving antenna of the radar apparatus 1. The relative speed (m/s) is a speed of the target relative to the host vehicle speed.

The lateral distance (m) is a distance from a position of the radar apparatus 1 to a position of the target in a left-right direction (width direction) of the host vehicle. The lateral distance is derived based on an angle of the target described later. The radar apparatus 1 outputs the target information to the vehicle control apparatus 2.

The vehicle control apparatus 2 controls a throttle and a brake of the host vehicle based on the target information received from the radar apparatus 1. The vehicle control apparatus 2 controls the throttle and the brake of the host vehicle in a traffic congestion such that the host vehicle travels at a predetermined speed (e.g. 5 m/s) or lower, keeping a predetermined inter-vehicular distance (e.g. 0.5 m) or greater to a preceding vehicle. The preceding vehicle is a vehicle traveling ahead of the host vehicle in a same direction as a direction in which the host vehicle is traveling, in a lane in which the host vehicle is traveling (hereinafter referred to as "current lane"). In a case where plural vehicles satisfy the foregoing conditions, the preceding vehicle is a vehicle closest to the host vehicle. As described above, the vehicle control system 10 in this embodiment functions as a cruise control system that controls the host vehicle to follow the preceding vehicle.

2. Radar Apparatus Block Diagram

Figure 2:
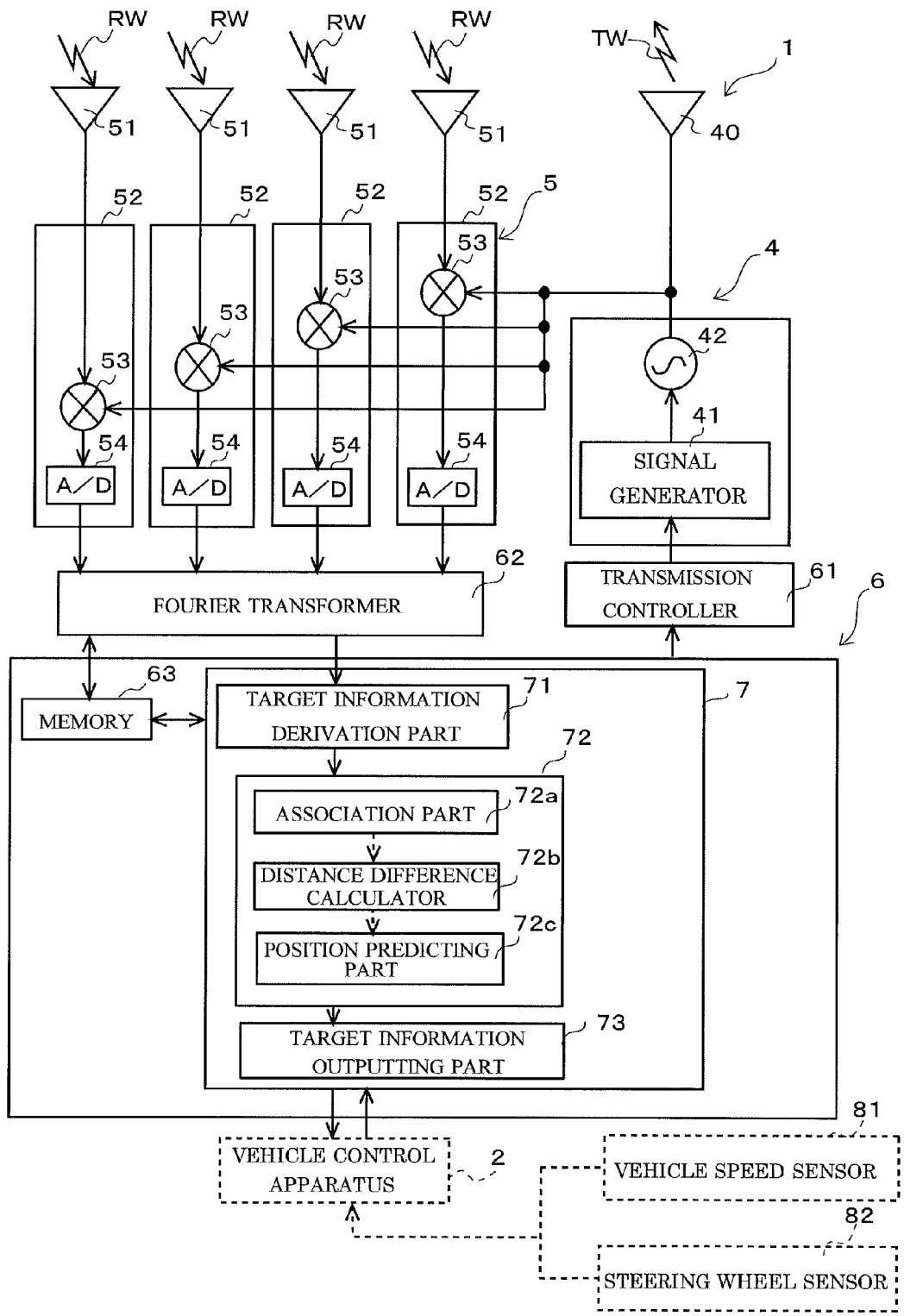
FIG. 2 illustrates a configuration of a radar apparatus.

FIG. 2 illustrates a configuration of the radar apparatus 1. The radar apparatus 1 is mounted, for example, in a front bumper of a vehicle. The radar apparatus 1 outputs a transmission wave to an outside of the vehicle and receives the reflection wave that is the transmission wave reflected by the target. The radar apparatus 1 mainly includes a transmitter 4, a receiver 5 and a signal processing apparatus 6.

The transmitter 4 includes a signal generator 41 and an oscillator 42. The signal generator 41 generates a modulation signal of which voltage changes in a triangular waveform, and provides the signal to the oscillator 42. The oscillator 42 modulates frequency of a continuous wave signal based on the modulation signal generated by the signal generator 41 to generate a transmission signal of which frequency changes as time passes, and then outputs the generated transmission signal to a transmission antenna 40.

The transmission antenna 40, based on the transmission signal output by the oscillator 42, outputs a transmission wave TW to the outside of the host vehicle. The transmission wave TW output by the transmission antenna 40 is a FM-CW of which frequency changes up and down in a predetermined cycle. The transmission wave TW is output from the transmission antenna 40 in the front direction of the host vehicle, and once being reflected by a target, such as the preceding vehicle, the transmission wave TW changes into a reflection wave RW.

The receiver 5 includes: plural receiving antennas 51 that form an array antenna; and plural individual receivers 52 that are connected to the plural receiving antennas 51. In this embodiment, the receiver 5 includes, for example, the four receiving antennas 51 and the four individual receivers 52. The four individual receivers 52 correspond to the four receiving antennas 51, respectively. Each of the receiving antennas 51 receives the reflection wave RW from the target and each of the individual receivers 52 processes a reception signal received by the corresponding receiving antenna 51.

Each of the individual receivers 52 includes a mixer 53 and an A/D converter 54. After the reception signal received by each of the receiving antennas 51 is amplified by a low noise amplifier (not illustrated), the amplified reception signal is sent to the mixer 53. The mixer 53 receives the transmission signal from the oscillator 42, and then mixes the transmission signal with the reception signal. Thus a beat signal is generated. The beat signal has a beat frequency that is a frequency difference between the transmission signal and the reception signal. The beat signal generated by the mixer 53 is converted into a digital signal by the A/D converter 54, and then the digital beat signal is output to the signal processing apparatus 6.

The signal processing apparatus 6 includes a microcomputer that has a CPU, a memory 63, etc. The signal processing apparatus 6 stores various data for calculation in the memory 63, a storage device. The signal processing apparatus 6 includes a transmission controller 61, a Fourier transformer 62 and a data processor 7 as functions implemented by software of the microcomputer. The transmission controller 61 controls the signal generator 41 of the transmitter 4.

The Fourier transformer 62 performs fast Fourier transformation (FFT) of the beat signal output from each of the plural individual receivers 52. Thus, the Fourier transformer 62 transforms the beat signal generated from the reception signal received by each of the plural receiving antennas 51 into a frequency spectrum that is data of a frequency range. The frequency spectrum acquired by the Fourier transformer 62 is output to the data processor 7.

The data processor 7 derives the target information of the target existing near (e.g. in the front direction) the host vehicle, based on the frequency spectrum of the reception signal received by each of the plural receiving antennas 51. The data processor 7 outputs the derived target information to the vehicle control apparatus 2.

The data processor 7 includes a target information derivation part 71, a target information processor 72 and a target information outputting part 73, as major functions. The target information derivation part 71 derives the target information of the target, such as the preceding vehicle, based on the frequency spectrum acquired by the Fourier transformer 62.

A vehicle category of the preceding vehicle is, for example, track and positions of a rear end portion and a bottom portion of the preceding vehicle are higher than a position of the radar apparatus 1. The rear end portion is, for example, a rear bumper and the like of the preceding vehicle. The bottom portion is, for example, a portion on which a battery and the like of the preceding vehicle are mounted. The bottom portion is a portion other than the rear end portion, and a distance from the position of the bottom portion of the preceding vehicle to the host vehicle is greater than a distance from the position of the rear end portion of the preceding vehicle to the host vehicle.

The target information derivation part 71 derives target information of the rear end portion of the preceding vehicle (hereinafter referred to as "rear end portion data set") and target information of the bottom portion of a vehicle body of the preceding vehicle (hereinafter referred to as "bottom portion data set") as target information of the preceding vehicle.

The target information processor 72 performs various processes of the derived target information, such as continuity determination and filtering. The target information processor 72 includes an association part 72a, a distance difference calculator 72b and a position predicting part 72c, as main functions. A data set that is prediction of the rear end portion data set (hereinafter referred to as "prediction data set") is generated by those functions in a filtering process, described later. In a case where the rear end portion data set derived in a previous target information derivation process (hereinafter referred to as "previous process") is not derived by the target information derivation part 71 in a latest target information deriving process (hereinafter referred to as "latest process"), the prediction data set is derived. A generation process of the prediction data set will be described later.

The target information outputting part 73 outputs the target information to the vehicle control apparatus 2. The data processor 7 receives, via the vehicle control apparatus 2, various information from a vehicle speed sensor 81, a steering wheel sensor 82 and other sensors that are provided to the host vehicle. The data processor 7 uses the information about, for example, the host vehicle speed input to the vehicle control apparatus 2 from the vehicle speed sensor 81, a steering wheel angle of the host vehicle input to the vehicle control apparatus 2 from the steering wheel sensor 82 and the like.

3. Target Information Derivation Method

Figure 3:
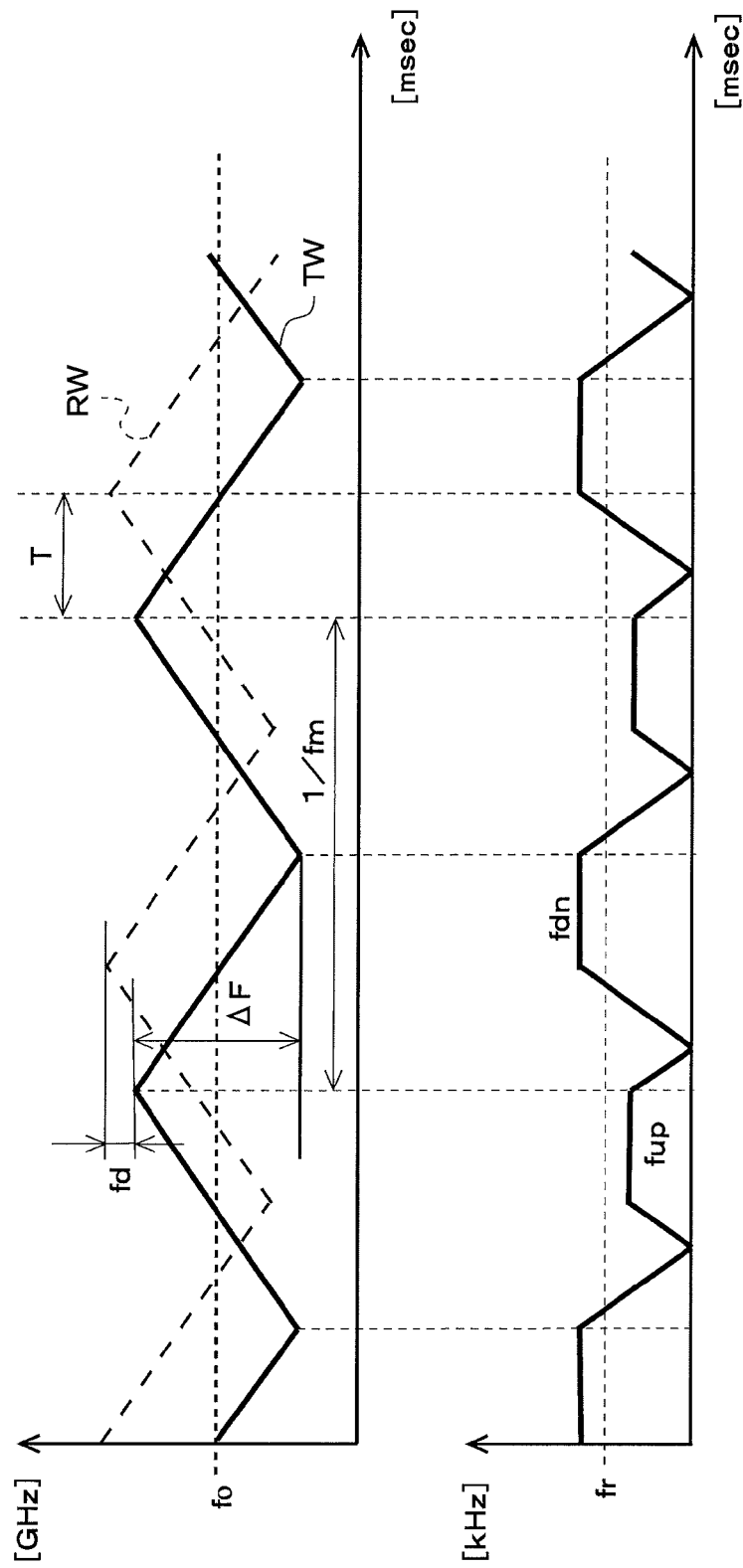
FIG. 3 illustrates a relationship between a transmission wave and a reflection wave.

Next described is a method (theory) that is used by the radar apparatus 1 to derive the target information (longitudinal distance, lateral distance and relative speed). FIG. 3 illustrates a relationship between the transmission wave TW and the reflection wave RW. To simplify the explanation below, the reflection wave RW in FIG. 3 is a reflection wave reflected only by one ideal target. In FIG. 3, the transmission wave TW is shown in a solid line, and the reflection wave RW is shown in a dashed line. In an upper figure of FIG. 3, a vertical axis represents frequency (GHz) and a horizontal axis represents time (msec).

As shown in FIG. 3, the transmission wave TW is a continuous wave of which frequency goes up and down from a predetermined center frequency in a predetermined cycle. The frequency of the transmission wave TW linearly changes with time. Hereinafter, a period in which the frequency of the transmission wave TW goes up is referred to as "up period," and a period in which the frequency goes down is referred to as "down period." Moreover, the center frequency of the transmission wave TW is referred to as a center frequency fo, a range (amount) of the frequency change of the transmission wave TW is as a frequency change range ΔF, and a reciprocal of one up-down cycle of the frequency of the transmission wave TW is as a reciprocal fm.

Since the reflection wave RW is the transmission wave TW reflected by the target, the reflection wave RW, like the transmission wave TW, is also a continuous wave of which frequency goes up and down from a predetermined center frequency in the predetermined cycle. However, the reflection wave RW is delayed by a time T from the transmission wave TW. The time lag T depends on a distance (longitudinal distance) R of the target to the host vehicle and is expressed in a formula 1 below, where c is a speed of light (a speed of an electrical wave).

$$T = \frac{2 \times R}{c} \qquad \text{[Formula 1]}$$

Due to the Doppler effect, a frequency shift of a frequency fd is generated to the reflection wave RW in comparison with the transmission wave TW and the frequency fd depends on a relative speed V of the target relative to the host vehicle.

As described above, in addition to the time lag, depending on the longitudinal distance of the target, the frequency shift is generated to the reflection wave RW in comparison with the transmission wave TW, depending on the relative speed of the target. Thus, as shown in a lower figure of FIG. 3, a beat frequency of the beat signal generated by the mixer 53 in the up period is different from a beat frequency of the beat signal in the down period. The beat frequency is a frequency difference between the transmission wave TW and the reflection wave RW. Hereinafter, the beat frequency in the up period is referred to as up-beat frequency fup, and the beat frequency in the down period is as down-beat frequency fdn. In the lower figure of FIG. 3, a vertical axis represents frequency (kHz) and a horizontal axis represents time (msec).

Assuming the relative speed of the target is "0 (zero)," a beat frequency fr is expressed in a formula 2 below. The case where the relative speed of the target is zero is a case where there is no frequency shift caused by the Doppler effect.

$$fr = \frac{fup + fdn}{2} \quad \text{[Formula 2]}$$

The beat frequency fr depends on the foregoing time lag T. Thus, the longitudinal distance R of the target is derived from a formula 3 below, by use of the beat frequency fr.

$$R = \frac{c}{4 \times \Delta F \times fm} \times fr \quad \text{[Formula 3]}$$

Moreover, the frequency fd shifted by the Doppler effect is expressed in a formula 4 below.

$$fd = \frac{fup - fdn}{2} \quad \text{[Formula 4]}$$

The relative speed V of the target is derived from a formula 5 below, by use of the derived frequency fd.

$$V = \frac{c}{2 \times f0} \times fd \quad \text{[Formula 5]}$$

In the description above, the longitudinal distance and the relative speed of the one ideal target are derived. However, practically, the radar apparatus 1 receives the reflection waves RW simultaneously from a plurality of targets existing in the front direction of the host vehicle. Therefore, information corresponding to each of the plurality of the targets is included in the frequency spectrum generated by the Fourier transformer 62 performing fast Fourier transformation of the beat signal generated from the reception signal.

4. Frequency Spectrum

Figure 4A:
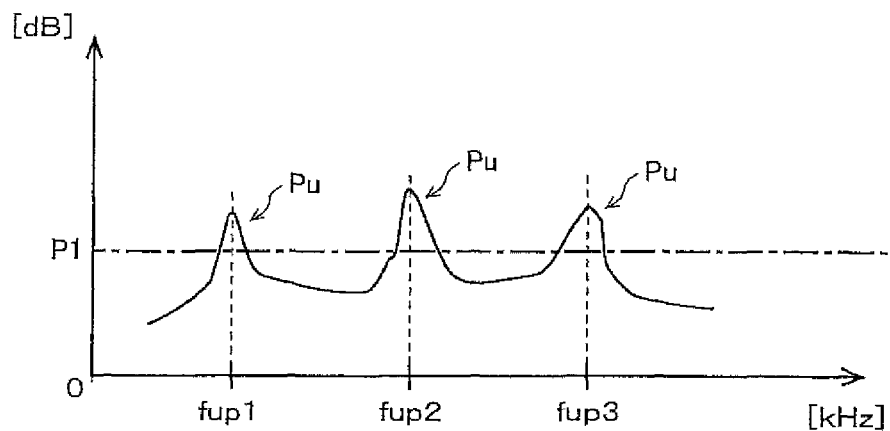
FIG. 4A illustrates an up-frequency spectrum.
Figure 4B:
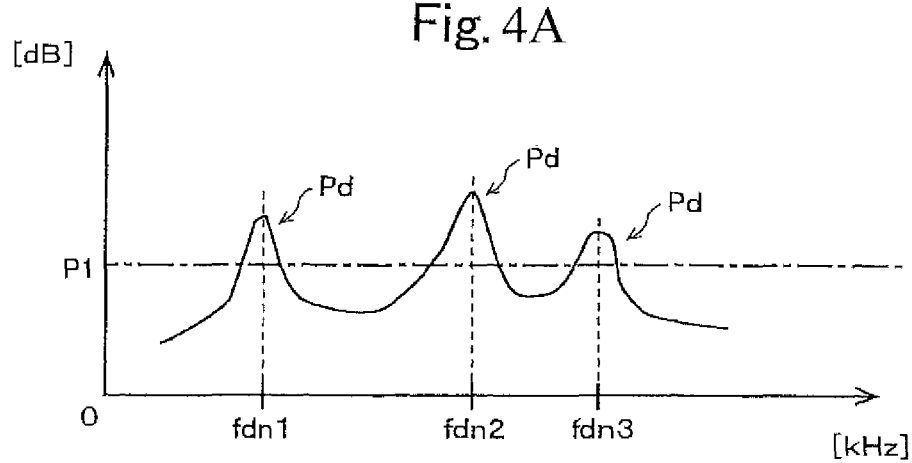
FIG. 4B illustrates a down-frequency spectrum.

FIG. 4A and FIG. 4B illustrate examples of such a frequency spectrum. FIG. 4A illustrates a frequency spectrum in the up period (hereinafter referred to as "up-frequency spectrum"), and FIG. 4B illustrates a frequency spectrum in the down period (hereinafter referred to as "down-frequency spectrum"). In FIGS. 4A and 4B, each of vertical axes represents signal power (dB), and each of horizontal axes represents frequency (kHz).

The up-frequency spectrum in FIG. 4A has peaks Pu at three frequencies fup1, fup2 and fup3. The down-frequency spectrum in FIG. 4B has peaks Pd at three frequencies fdn1, fdn2 and fdn3. In the description below, a frequency may also be expressed in bin, a different unit of frequency. One bin is equivalent to about 467 Hz.

In a case where a relative speed of a target is not considered, a frequency of a peak in a frequency spectrum represents a longitudinal distance of the target. One bin is equivalent to approx. 0.36 m in terms of a longitudinal distance of a target. For example, the up-frequency spectrum in FIG. 4A shows that three targets exist at longitudinal distances corresponding to the three frequencies fup1, fup2 and fup3 of the three peaks Pu.

Therefore, the target information derivation part 71 (refer to FIG. 2) extracts, from the up-frequency spectrum and the down-frequency spectrum, the frequencies of the peaks Pu and the peaks Pd that have powers greater than a predetermined threshold P1. The frequency extracted as described above is hereinafter referred to as "peak frequency."

The up-frequency spectrum and the down-frequency spectrum are obtained based on the reception signal received by each receiving antenna 51. Thus, the Fourier transformer 62 derives the up-frequency spectrum and the down-frequency spectrum based on each of the reception signals received by the four individual receiving antennas 51.

Since the four receiving antennas 51 receive the reflection waves RW reflected by same targets, peak frequencies extracted from one of the frequency spectrums based on reception signals received by the four individual receiving antennas 51 are the same as peak frequencies extracted from the other frequency spectrums based on reception signals received by the four individual receiving antennas 51. However, since the four receiving antennas 51 are located at different positions from one another, phases of the reflection waves RW received by the four receiving antennas 51 are different from one another. Thus, phase information of the reception signals received by the receiving antennas 51 differs from one another even if the reception signals have a same bin.

Moreover, in a case where plural targets exist at a same bin but at different angles, target information of the plural targets is included in a peak frequency of the signal. Therefore, in a direction calculation process, the target information derivation part 71 separates the information about the plural targets included in the signal having the peak frequency into information about each of the plural targets, and then estimates respective angles of the plural targets.

If there is a peak frequency at a same bin across all of the frequency spectrums generated based on the reception signals received by the four receiving antennas 51, the target information derivation part 71 estimates the angles of the plural targets in the direction calculation process that uses the phase information of the reception signals.

A well-known angle estimation method, such as ESPRIT (Estimation of Signal Parameters via Rotational Invariance Techniques), MUSIC (MUltiple SIgnal Classification) and PRISM (Panchromatic Remotesensing Instrument for Stereo Mapping), is used as a method for direction calculation. Thus, the target information derivation part 71 derives the plural angles and powers of the signal (signal power) at the plural angles, from the signal having the peak frequency.

5. Angle Spectrum

Figure 5:
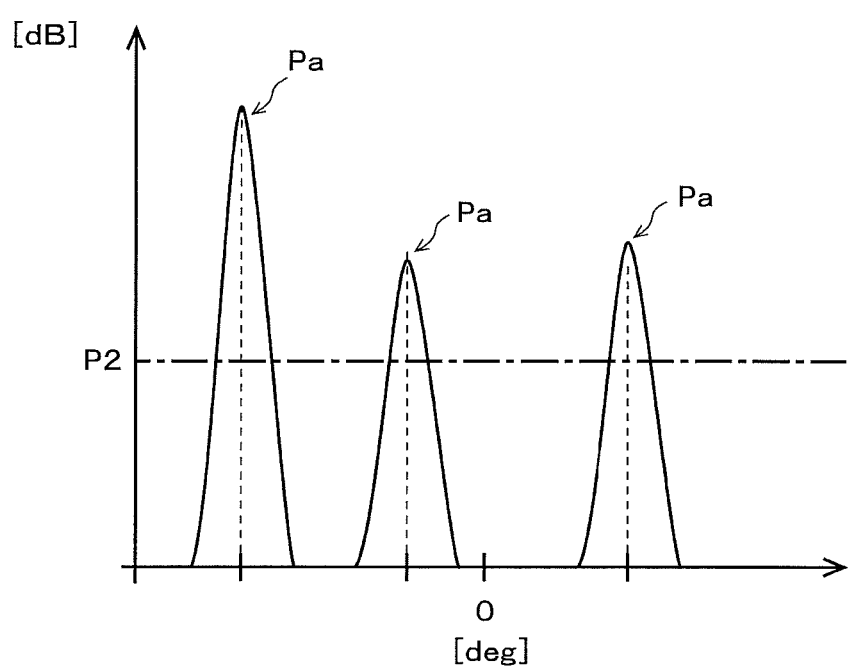
FIG. 5 is a conceptual illustration of an angle spectrum of angles estimated in a direction calculation process.

FIG. 5 is a conceptual illustration of an angle spectrum of the angles estimated in the direction calculation process. In FIG. 5, a vertical axis represents signal power (dB) and a horizontal axis represents angle (degree). An angle estimated in the direction calculation process is shown as a peak Pa that is greater than a predetermined threshold P2 in the angle spectrum in FIG. 5. The angle estimated in the direction calculation process is hereinafter referred to as "peak angle." As described above, plural peak angles concurrently derived from one signal having the peak frequency show angles of plural targets existing at a same bin.

The target information derivation part 71 derives peak angles, as described above, from all peak frequencies in the up-frequency spectrum and the down-frequency spectrum.

In the process described above, the target information derivation part 71 derives peak data sets of each of the plural targets existing in the front direction of the host vehicle. Each of the peak data sets includes parameters of the foregoing peak frequency, peak angle, signal power at the peak angle (hereinafter referred to simply as "signal power"), etc. The data processor 7 derives the peak data sets of the up period and the down period (hereinafter referred to respectively as "up-peak data set" and "down-peak data set").

Moreover, the target information derivation part 71 pairs the derived up-peak data sets with the derived down-peak data sets in a pairing process. The target information derivation part 71, for example, calculates a Mahalanobis distance MD, using the peak angles and signal powers in the up period and the down period, based on a formula 6.

$$MD = a \times (\theta d)^2 + b \times (\theta p)^2 \quad \text{[Formula 6]}$$

In the formula, $\theta d$ represents a peak angle difference between the up period and the down period, and $\theta p$ represents a signal power difference between the up period and the down period. Moreover, a and b are coefficients.

The target information derivation part 71 pairs one of the up-peak data sets with one of the down-peak data sets such that the Mahalanobis distance MD of the pair is a smallest value. Thus, the target information derivation part 71 pairs the peak data sets associated with a same target. Such a target data set obtained by pairing the two peak data sets is also referred to as "pair data set."

The target information derivation part 71 derives the target information of the target, using the parameters of the up-peak data set and the down-peak data set from which the pair data set is obtained. Therefore, the pair data set is target information derived in one target information derivation process.

In other words, the target information derivation part 71 calculates the longitudinal distance R of the target, using the foregoing formulae 2 and 3, and the relative speed V of the target, using the foregoing formulae 4 and 5.

Further, the target information derivation part 71 calculates an angle $\theta$ of the target based on a formula 7 below, where $\theta up$ is a peak angle of the up period (hereinafter referred to as "up-peak angle") and where $\theta dn$ is a peak angle of the down period (hereinafter referred to as "down-peak angle"). Then, the target information derivation part 71 obtains a lateral distance of the target by calculation of trigonometric function, based on the angle $\theta$ and the longitudinal distance R of the target.

$$\theta = \frac{\theta up + \theta dn}{2} \quad \text{[Formula 7]}$$

6. Target Information Derivation Process

Figure 6:
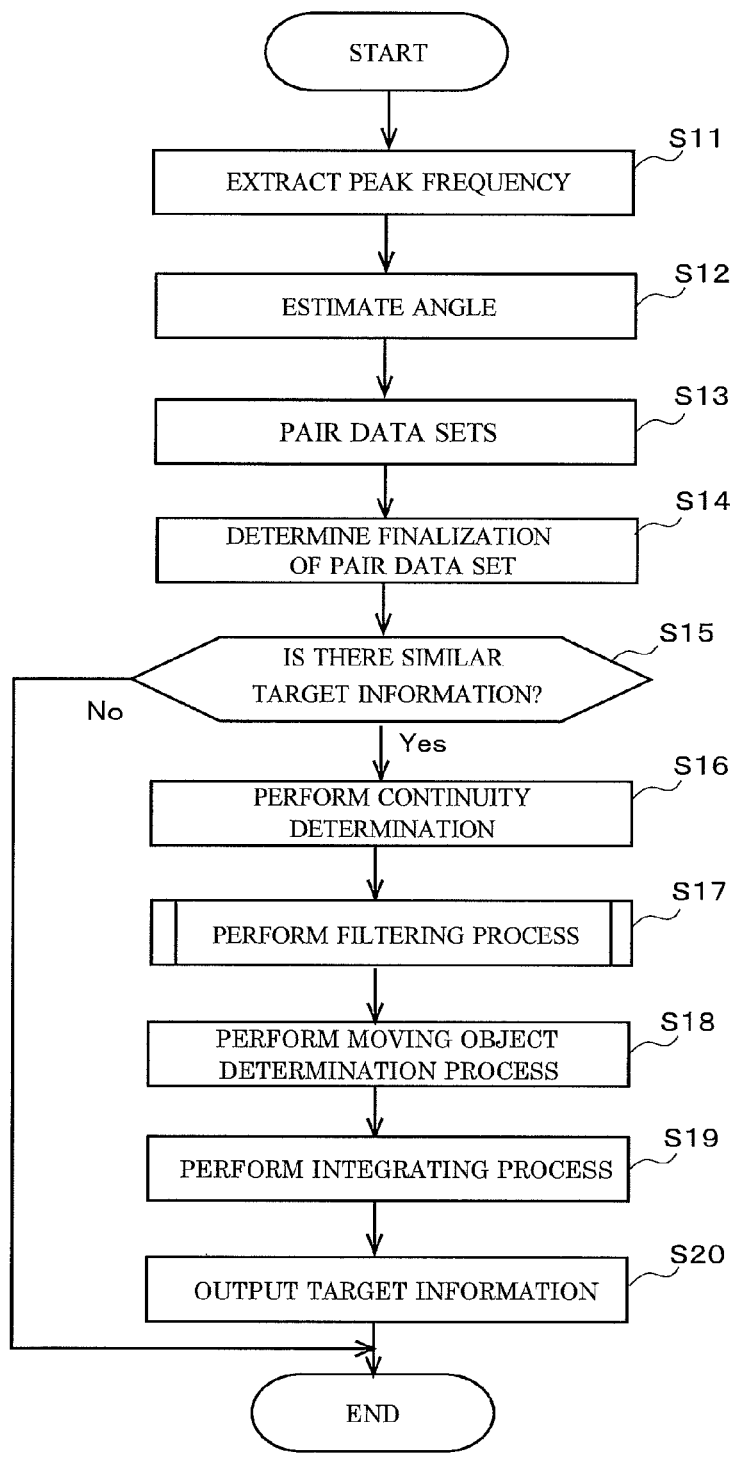
FIG. 6 illustrates a flow of a target information derivation process.

Next described is an entire flow of the target information derivation process where the data processor 7 derives the target information and then outputs the derived target information to the vehicle control apparatus 2. FIG. 6 illustrates the entire flow of the target information derivation process.

The data processor 7 repeats the target information derivation process in a predetermined time cycle (e.g., 1/20 second cycle). Before a start of the target information derivation process, the data processor 7 already receives the up-frequency spectrums and the down-frequency spectrums generated based on the reception signals received by the four receiving antennas 51.

First, the target information derivation part 71 of the data processor 7 extracts peak frequencies from the frequency spectrums (a step S11). The target information derivation part 71 extracts, as peak frequencies, from the up-peak frequency spectrum and the down-peak frequency spectrum, frequencies corresponding to peaks that have powers greater than the predetermined threshold.

Next, in the direction calculation process, the target information derivation part 71 estimates angles of targets associated with signals of the extracted peak frequencies. The target information derivation part 71 derives an angle and a signal power of each of the plural targets existing at a same bin (a step S12).

Thus, the target information derivation part 71 derives the peak data sets of each of the plural targets. The target information derivation part 71 derives the up-peak data sets and the down-peak data sets each of which includes the parameters of the peak frequency, the peak angle, and the signal power.

Next, the target information derivation part 71 calculates the Mahalanobis distances MD based on all possible pairs of the up-peak data sets and the down-peak data sets, and pairs the up-peak data set with the down-peak data set such that the Mahalanobis distance MD of the pair is a smallest value (a step S13).

The target information derivation part 71 derives the pair data set based on the paired peak data set. In other words, the target information derivation part 71 derives the longitudinal distance, the lateral distance and the relative speed by the calculation described above.

Next, the target information derivation part 71 performs a determination process to finalize the pair data set (a step S14). The target information derivation part 71 determines whether or not a pair data set that has target information similar to the target information of a pair data set derived in the previous process, is derived in the latest process. In a case where the pair data set that has the target information similar to the target information of the pair data set derived in the previous process, is derived in the latest process (Yes in a step S15), the target information derivation part 71 finalizes the pair data set derived in the latest process, as a pair data set that has the target information to be output to the vehicle control apparatus 2.

In a case where the pair data set that has the target information similar to the target information of the pair data set derived in the previous process, is not derived in the latest process (No in the step S15), the target information derivation part 71 determines that the pair data set derived in the latest process is not the pair data set to be output to the vehicle control apparatus 2, and ends the process.

The target information derivation process is repeated in the predetermined time cycle (e.g., 1/20 second cycle). Therefore, the target information derivation part 71 derives the pair data set in the predetermined time cycle.

Next, the target information processor 72 performs the continuity determination (a step S16). The target information processor 72 determines whether or not there is a temporal continuity between the pair data set derived in the previous process (hereinafter referred to also as "previous pair data set") and the pair data set derived in the latest process (hereinafter referred to also as "latest pair data set"). In other words, the target information processor 72 determines whether or not the previous pair data set and the latest pair data set are associated with a same target.

In a case where no pair data set having the temporal continuity with the previous pair data set is derived in the latest process, the target information processor 72 performs an "extrapolation process" that derives assumed target information in the latest process.

The pair data set derived in the extrapolation process is used as a pair data set derived in the latest process. In a case where the extrapolation process is continuously performed, a target for which the extrapolation process has been performed is determined as a target not existing in a transmission range of the transmission wave TW. Thus, the target information of the target is deleted from the memory 63. Concretely, a value relating to the target information given to a target number of the target is deleted. Once the value is deleted, a value that represents the deletion of the target information is given to the target number. The target number is a mark to identify a target and a different target number is given to each target.

Next, the target information processor 72 derives target information by smoothing the target information derived in the previous process and the target information derived in the latest process in a direction in which the time advances (a step S17). The target information derived in the smoothing process (filtering process) is referred to as "filter data set." As described above, the filter data set is derived by plural target information derivation processes.

Next, the target information processor 72 sets a moving object flag and a preceding vehicle flag to the target information in a moving object determination process (a step S18). The moving object flag represents whether or not a target associated with the target information is moving. The preceding vehicle flag represents whether or not a target associated with the target information has traveled before, even once, in a same direction as the traveling direction of the host vehicle.

Concretely, the target information processor 72 sets the moving object flag and the preceding vehicle flag based on an absolute speed and a moving or traveling direction of the target. The absolute speed and the moving/traveling direction of the target are derived based on the relative speed of the target information and on the host vehicle speed acquired from the vehicle speed sensor 81. The target information of the preceding vehicle satisfies plural conditions. For example, the plural conditions are (1) the moving object flag is on, (2) the preceding vehicle flag is on, (3) the lateral distance of the target is in the current lane and (4) in a case where there are plural vehicles, the target information has a smallest longitudinal distance.

The target information processor 72 performs an integrating process that integrates plural pieces of target information into one data set of one target (a step S19). In a case where the target information processor 72 derives the rear end portion data set and the bottom portion data set, those two data sets are target information associated with a same object, i.e., a same vehicle. Therefore, the two pieces of the target information are integrated into one and outputs only the rear end portion data set to the vehicle control apparatus 2. A reason why only the rear end portion data set is output to the vehicle control apparatus 2, rather than the bottom portion data set, is because the vehicle control apparatus 2 can acquire an accurate distance between the host vehicle and the preceding vehicle so that the vehicle control apparatus 2 can prevent a collision of the host vehicle with the preceding vehicle.

The target information outputting part 73 outputs the target information, including the prediction data set, to the vehicle control apparatus 2 (a step S20). The target information outputting part 73 outputs a predetermined number of pieces of the target information (e.g. 10 pieces) among plural pieces of the derived target information. The target information outputting part 73 preferentially outputs the target information of, for example, the preceding vehicle to the vehicle control apparatus 2.

The target information derived in the target information derivation process as described above is stored in the memory 63 and is used as the target information derived in the previous process in next and subsequent target information derivation processes.

7. Filtering Process

<7-1. Filter Data Set Derivation Process and Associating Process>

Figure 7:
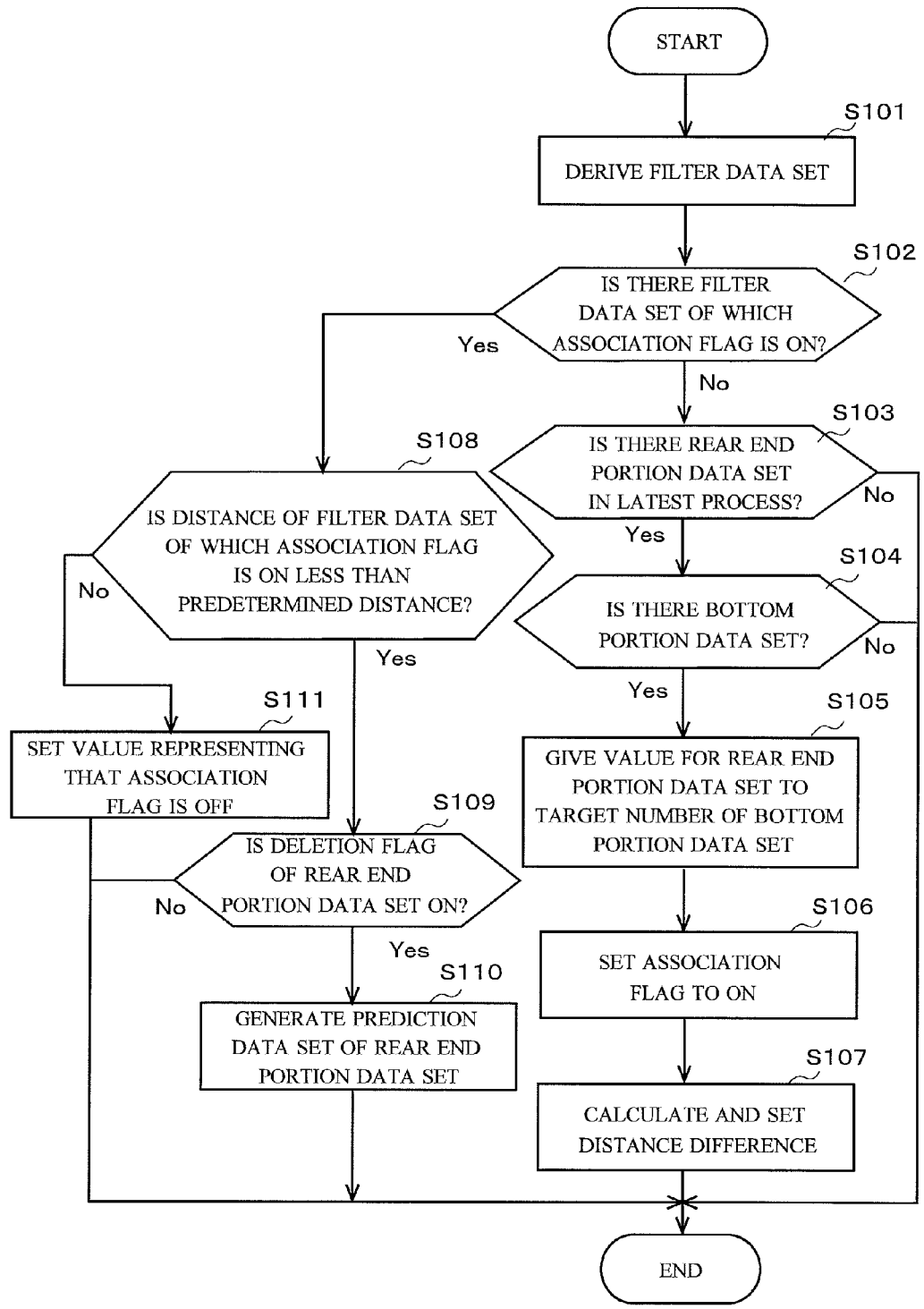
FIG. 7 illustrates a flow of a filtering process.

Next, the filtering process (the step S17) will be described with reference to FIG. 7. FIG. 7 illustrates a flow of the filtering process. First, the target information processor 72 derives the filter data set by smoothing the target information derived in the previous process and the target information latest derived in the latest process, in the direction in which the time advances (a step S101).

Next, the target information processor 72 determines whether or not a filter data set of which an association flag is on has been derived (a step S102). In a case where the bottom portion data set is associated with the rear end portion data set, the target information processor 72 sets to on the association flag of the bottom portion data set. As described above, the association flag is a mark showing that the rear end portion data set and the bottom portion data set are associated with a same vehicle. On/off of the association flag is passed on to a series of the bottom portion data sets among which there is the temporal continuity.

First explained is a case where it is determined in the determination of the step S102 that the bottom portion data set has not been associated with the rear end portion data set in the previous process, i.e., that no filter data set of which the association flag is on has been derived (No in the step S102).

The target information processor 72 determines whether or not there is a high possibility that the rear end portion data set cannot be derived due to a short distance between the preceding vehicle and the host vehicle (a step S103). A rear end portion data set having such a possibility is target information including a smallest longitudinal distance, among the plural target information.

A concrete process performed in the step S103 will be described below. In a case where the host vehicle speed is at or less than a predetermined speed (e.g. 5 m/s), i.e., in a case where the host vehicle is substantially about to stop, the target information processor 72 determines whether or not plural filter data sets satisfy conditions (a1) to (a4) below. As described above, in the case where the absolute speed of the host vehicle is at or less than the predetermine speed, the process in the step S103 is performed. Thus a processing load of the radar apparatus 1 can be reduced. The filter data set to be determined is hereinafter referred to as "determined filter data set." As described above, here, R represents longitudinal distance, V represents relative speed and Rs represents lateral distance.

(a1) R≤7 m
(a2) V<1 m/s
(a3) Extrapolation flag=off
(a4) −1.8 m≤Rs≤1.8 m

Based on the conditions (a1) and (a2), it is determined whether or not a vehicle associated with the determined filter data set is traveling short distance away from the host vehicle substantially at a same speed as a relatively slow speed of the host vehicle.

Base on the condition (a3), it is determined whether or not the determined filter data set is not an extrapolated data set. In other words, it is determined whether or not the determined filter data set is derived as a data set having a temporal continuity.

Based on the condition (a4), it is determined whether or not the determined filter data set is a data set associated with a vehicle in the current lane in which the host vehicle is traveling. The distance −1.8 m is a distance from a substantial center to a left end of the current lane because the host vehicle travels in the substantial center of the current lane in many cases. The distance 1.8 m is a distance from the substantial center to a right end of the current lane.

In a case where the determined filter data set satisfies all the conditions (a1) to (a4) (Yes in the step S103), the target information processor 72 determines the determined filter data set as the rear end portion data set. In other words, a value representing that the determined filter data set is the rear end portion data set is given to the target number of the determined filter data set.

The explanation above is described on the assumption that there is one filter data set that satisfies all the conditions (a1) to (a4). In a case where there are plural filter data sets that satisfy all the conditions (a1) to (a4), the target information processor 72 determines, as the rear end portion data set, a filter data set that has been most frequently determined to be having the temporal continuity in the temporal continuity determination of plural target information derivation processes because a filter data set that has been more frequently determined to be having a temporal continuity has a higher possibility of an actual presence than a filter data set that has been less frequently determined to be having a temporal continuity.

Moreover, in a case where any one of the conditions (a1) to (a4) is not satisfied (No in the step S103), the target information processor 72 determines that there is no rear end portion data set and ends the filtering process.

Next, the target information processor 72 determines whether or not there is the bottom portion data set corresponding to the rear end portion data set (a step S104). In other words, the target information processor 72 determines whether or not there is the bottom portion data set associated with a same vehicle with which the rear end portion data set is associated.

A concrete process performed by the target information processor 72 will be described below. The target information processor 72 determines whether or not conditions (b1) to (b4) below are satisfied by filter data sets other than filter data sets determined as the rear end portion data set. Here, Ra represents a longitudinal distance of the determined filter data set, Rb represents a longitudinal distance of the rear end portion data set, Va represents a relative speed of the determined filter data set and Vb represents a relative speed of the rear end portion data set.

(a1) 0.5 m≤Ra−Rb≤3 m
(a2) |Va−Vb|≤1 m/s
(a3) Extrapolation flag=off
(a4) −1.8 m≤Rs≤1.8 m Based on the conditions (b1) and (b2), it is determined whether or not a target associated with the determined filter data set is further from the host vehicle than a target associated with the rear end portion data set. Moreover, it is determined whether or not the determined filter data set is associated with a same vehicle with which the rear end portion data set is associated.

Based on the conditions (b3), it is determined whether or not the determined filter data set is not a data set derived in the extrapolation process. In other words, it is determined whether or not the determined filter data set is a derived data set having the temporal continuity.

Based on the condition (b4), it is determined whether or not the determined filter data set is a data set associated with a vehicle in the current lane in which the host vehicle is traveling.

In a case where the determined filter data set satisfies all the conditions (b1) to (b4) (Yes in the step S104), the target information processor 72 determines that the determined filter data set is the bottom portion data set associated with a same vehicle with which the rear end portion data set is associated. A value representing that the bottom portion data set is the rear end portion data set is given by the association part 72a of the target information processor 72, to the target number of the bottom portion data set (a step S105).

In other words, the association part 72a associates the bottom portion data set with the rear end portion data set. Then the association part 72a sets the value representing that the bottom portion data set is associated with the rear end portion data set (a value representing that the association flag is on) to the bottom portion data set (a step S106). The association flag as described above is set to on only for one bottom portion data set.

The explanation above is described on an assumption that there is one filter data set that satisfies all the conditions (b1) to (b4). In a case where there are plural filter data sets that satisfy all the conditions (b1) to (b4), the target information processor 72 determines, as the bottom portion data set, a filter data set that has been most frequently determined to be having the temporal continuity in the temporal continuity determination of plural target information derivation processes. Moreover, in a case where any one of the conditions (b1) to (b4) is not satisfied (No in the step S104), the target information processor 72 determines that there is no bottom portion data set that is associated with a same vehicle with which the rear end portion data set is associated and ends the filtering process.

Figure 8:
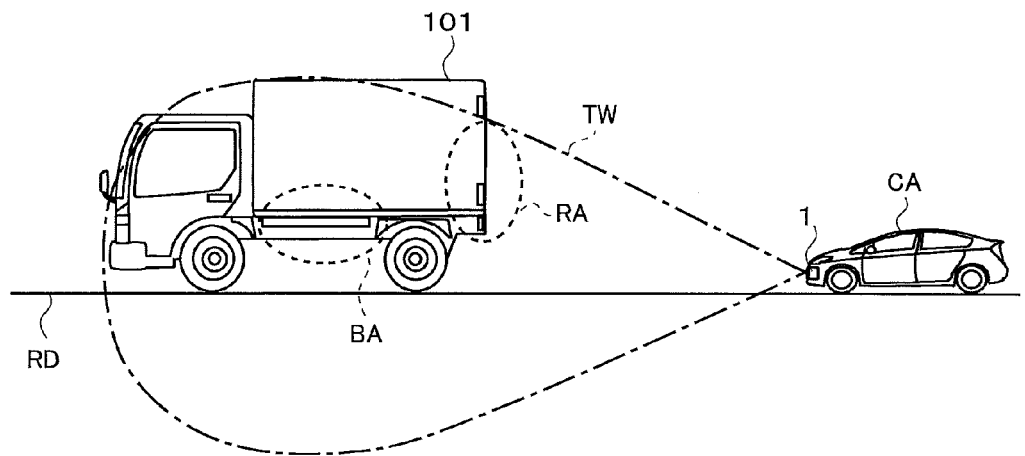
FIG. 8 illustrates target information based on a reflection wave reflected by a preceding vehicle that is away from a host vehicle to some extent in terms of a longitudinal distance.
Figure 9:
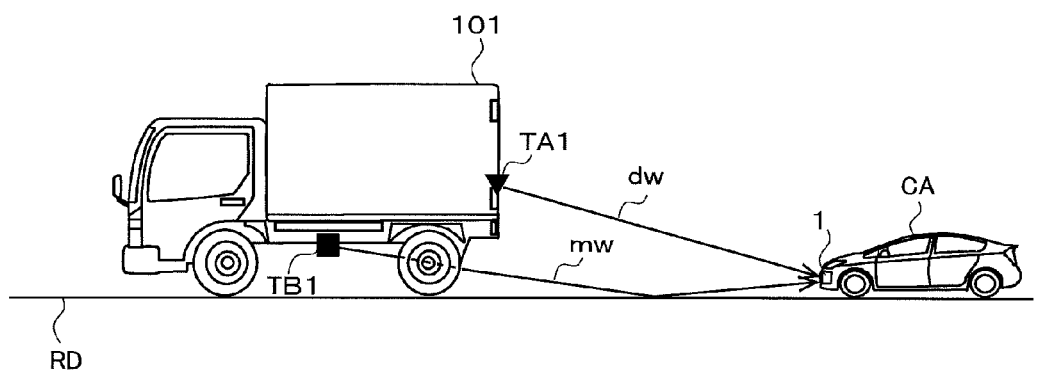
FIG. 9 illustrates target information based on a reflection wave reflected by the preceding vehicle that is away from the host vehicle to some extent in terms of a longitudinal distance.

Here, a concrete example of associating two filter data sets will be described below with reference to FIGS. 8 to 11. Each of FIGS. 8 to 9 illustrates target information based on a reflection wave from a preceding vehicle 101 that is away from the host vehicle to some extent in terms of the longitudinal distance. As shown in FIG. 8, the radar apparatus 1 is mounted on a host vehicle CA traveling in a current lane RD and the transmission wave TW is transmitted in the traveling direction of the host vehicle CA.

A part of the vehicle body of the preceding vehicle 101 is included in the transmission range of the transmission wave TW. Concretely, a rear end portion RA to which a rear bumper, a rear door, etc. of the preceding vehicle 101 are provided and a bottom portion BA to which a battery and the like of the preceding vehicle 101 are provided are included in the transmission range. As shown in FIG. 9, the target information derivation part 71 derives target information TA1 (▼) based on a direct wave dw and also derives target information TB1 (■) based on a multipath wave mw. The direct wave dw is a direct reflection wave reflected by the rear end portion RA of the preceding vehicle 101. The multipath wave mw is a multipath wave reflected by the bottom portion BA of the preceding vehicle 101.

A reason why such a multipath wave occurs is because a position of the rear bumper of the preceding vehicle 101 is higher than a position of the radar apparatus 1. In other words, since a height of the rear bumper of the preceding vehicle 101 from a road surface of the current lane RD is higher than a height of the radar apparatus 1 mounted on the host vehicle CA from the road surface of the current lane RD, such a multipath wave occurs.

Figure 10:
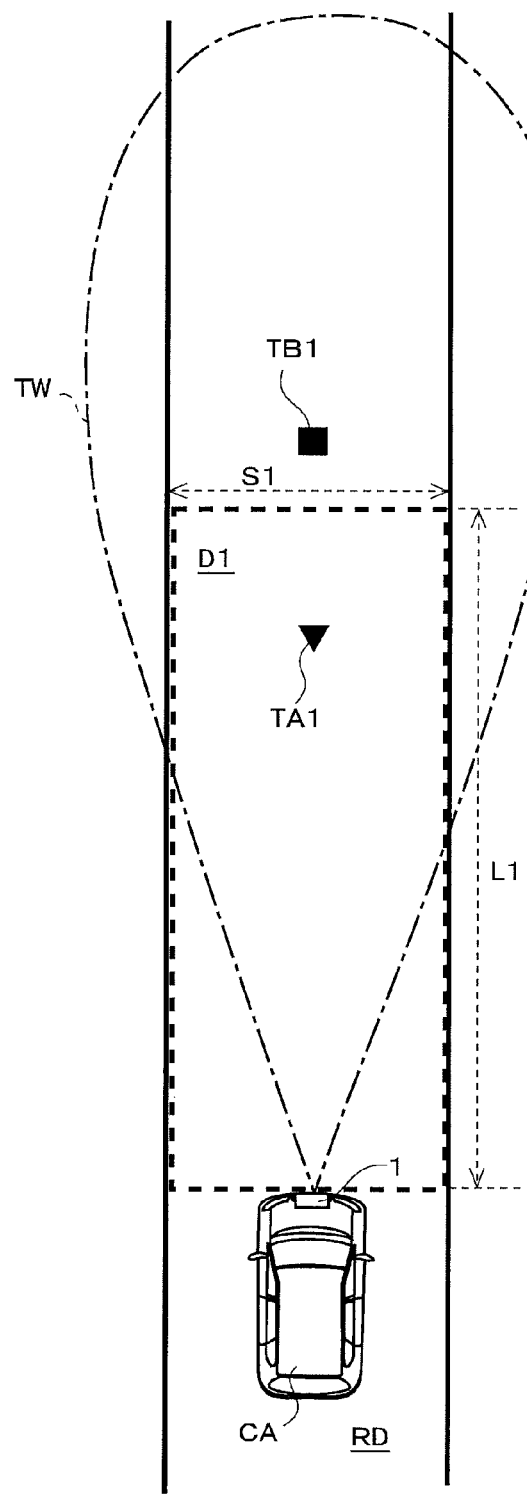
FIG. 10 illustrates a concrete example of determining a rear end portion data set.

FIG. 10 illustrates a concrete example of determining the rear end portion data set. A determination range D1 shown in a dashed line in FIG. 10 is a range satisfies the conditions (a1) and (a4). On an assumption that the radar apparatus 1 is located at the longitudinal distance of 0 m, a distance L1 in the traveling direction is, for example, 7 m and a distance S1 in the width direction is equivalent to a width of the current lane RD of, for example, 3.6 m.

In a case where a position of the target information TA1 is, as shown in FIG. 10, in the determination range DI, the conditions (a1) and (a4) are satisfied. In addition, in a case where the target information TA1 satisfies the condition (a2) that the relative speed of the target information TA1 is in a predetermined range and the condition (a3) that the extrapolation process has not been performed for the target information TA1, the target information TA1 is determined as the rear end portion data set (rear end portion data set TA1).

Figure 11:
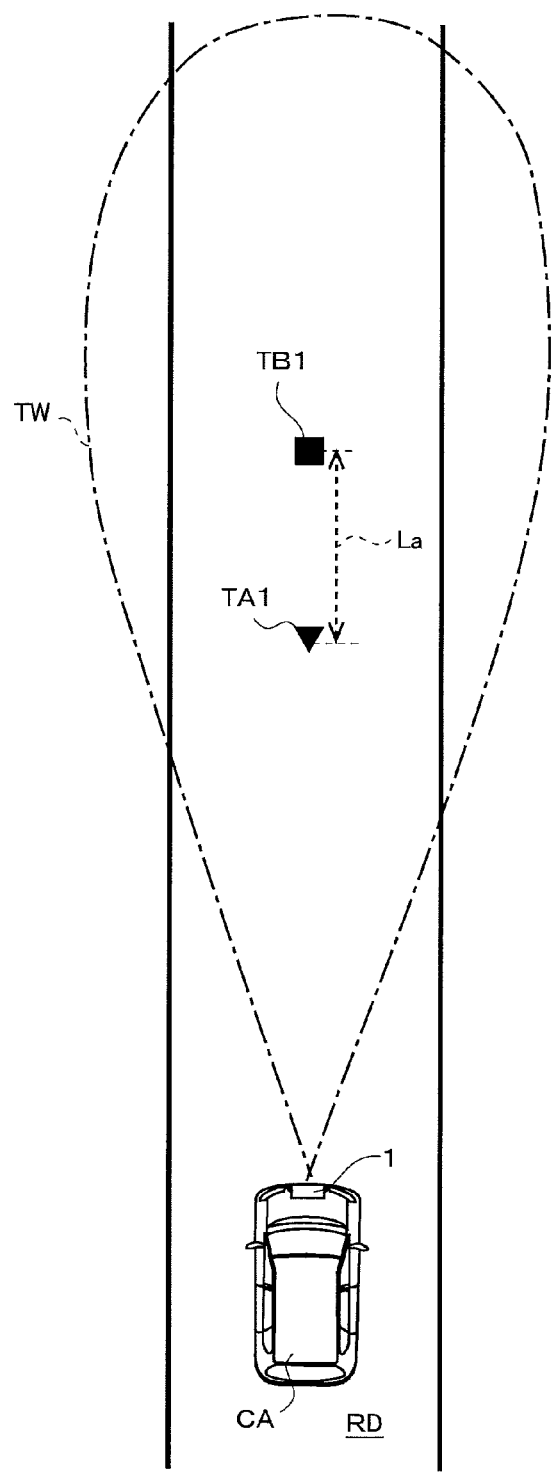
FIG. 11 illustrates a concrete example of determining a bottom portion data set.

Next, FIG. 11 illustrates a concrete example of determining the bottom portion data set. In a case where a longitudinal distance difference between the target information TA1 and the target information TB1 derived in the current lane RD shown in FIG. 11 is in a range from 0.5 m to 3 m, the conditions (b1) and (b4) are satisfied. In addition, in a case where the target information TB1 satisfies the condition (b2) on which whether or not the relative speed of the target information TB1 is in the predetermined speed and the condition (b3) on which whether or not the extrapolation process has not been performed, the target information TB1 is determined as the bottom portion data set (the bottom portion data set TB1).

With reference back to the process in the step S106 of FIG. 7, the association part 72a sets to on the association flag of the filter data set corresponding to the bottom portion data set TB1 (the step S106). The distance difference calculator 72b calculates the longitudinal distance difference by subtracting a longitudinal distance of the rear end portion data set TA1 from a longitudinal distance of the bottom portion data set TB1, stores the distance difference in the memory 63 (a step S107) and then ends the filtering process. Thus, a positional relationship between the rear end portion data set TA1 and the bottom portion data set TB1 is stored in the memory 63. The longitudinal distance difference representing the positional relationship between the two data sets is passed on to a series of the filter data sets having the temporal continuity with the bottom portion data set TB1. Moreover, the value representing on/off of the association flag is also passed on to the series of the filter data sets having the temporal continuity.

<7-2. Generation of Prediction Data Set>

On an assumption that the target information derivation process described above is a previous process and that a bottom portion data set TB2 having the temporal continuity with the bottom portion data set TB1 derived in the previous process has been derived in a latest process in the step S101 of FIG. 7, the generation of the prediction data set will be described below. The value representing that the association flag is on and the longitudinal distance difference derived in the previous process are passed on to the bottom portion data set TB2 from the bottom portion data set TB1.

In the step S102, the association flag of the bottom portion data set TB2 is on (Yes in the step S102). Therefore, the target information processor 72 determines whether or not a longitudinal distance of the bottom portion data set TB2 is less than a predetermined distance (e.g. 10 m) (a step S108).

Then, in a case where the longitudinal distance of the bottom portion data set TB2 is less than the predetermined distance (Yes in the step S108), the target information processor 72 determines whether or not a value representing that a deletion flag is on is set to the target number of a rear end portion data set TA2 (a step S109).

The rear end portion data set for which the deletion flag is set to on is a data set for which the extrapolation process has been often performed in plural target information derivation processes. In a case where the deletion flag of the rear end portion data set TA2 is set to on, the target number of the rear end portion data set TA2 is given the value representing that the target information is to be deleted from the memory 63.

In a case where the value representing that the deletion flag is on is set to the target number of the rear end portion data set TA2 (Yes in the step S109), the position predicting part 72c of the target information processor 72 generates a prediction data set of the rear end portion data set TA2, using position information of the bottom portion data set TB2 in the latest process and the longitudinal distance difference passed on to the bottom portion data set TB2 (a step S110).

Thus, even in a case where the rear end portion data set TA2 of the preceding vehicle 101 is not derived, the radar apparatus 1 accurately predicts the rear end portion data set TA2 and outputs to the vehicle control apparatus 2 target information of an appropriate target that the host vehicle CA follows.

Moreover, in a case where the host vehicle CA travels at or less than the predetermined speed and where the rear end portion data set TA1 has been associated with the bottom portion data set TB1, the radar apparatus 1 generates the prediction data set. Thus, the radar apparatus 1 reduces the processing load of the radar apparatus 1 because the prediction data set of the rear end portion of the preceding vehicle 101 is generated only after the two data sets are associated with each other.

Figure 12:
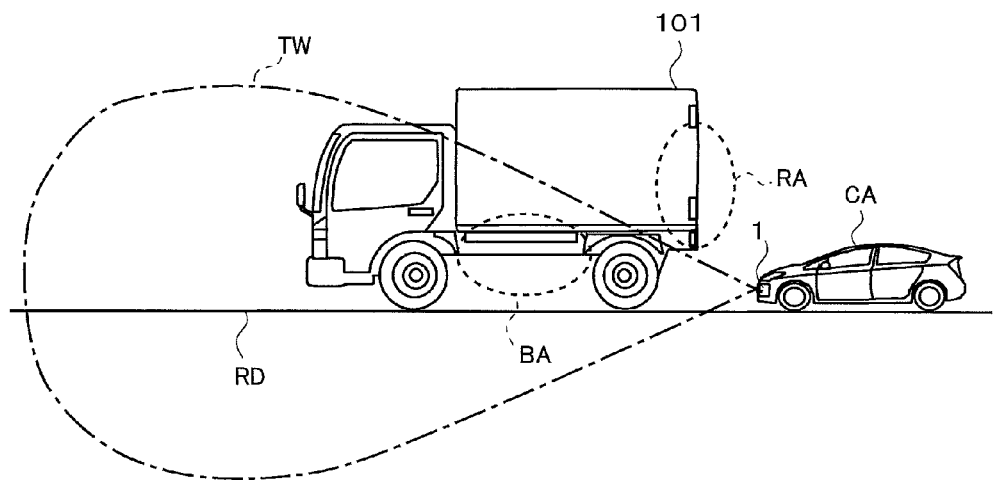
FIG. 12 illustrates target information based on a reflection wave reflected by a preceding vehicle in a short distance from a host vehicle.
Figure 13:
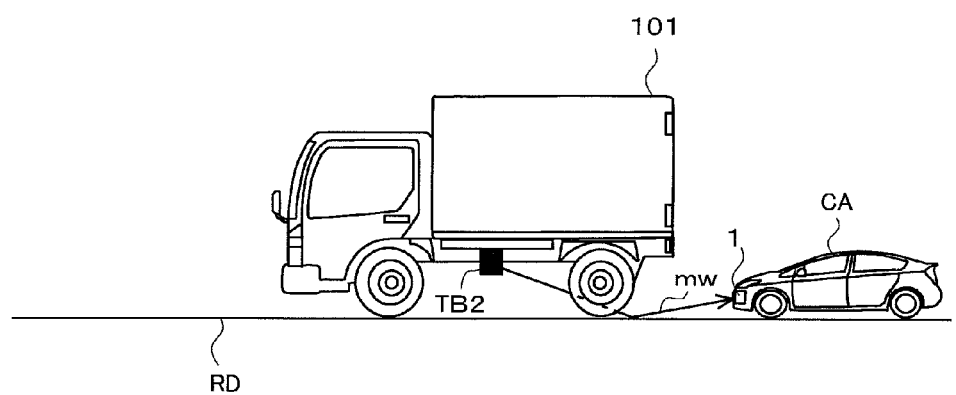
FIG. 13 illustrates target information based on a reflection wave reflected by the preceding vehicle in a short distance from the host vehicle.

Here, a concrete example of generating the prediction data set will be described below with reference to FIGS. 12 to 14. Each of FIGS. 12 to 13 illustrates target information based on a reflection wave from the preceding vehicle 101 in a short distance from the host vehicle CA. As shown in FIG. 12, the host vehicle CA is closer to the preceding vehicle 101 and thus the rear end portion RA of the preceding vehicle 101 comes out of the transmission range of the transmission wave TW. As a result, the target information derivation part 71 does not derive target information of the rear end portion RA. Instead, as shown in FIG. 13, the target information derivation part 71 derives the target information TB2 (■) based on the multipath wave mw from the bottom portion BA of the preceding vehicle 101. The target information TB2 is the bottom portion data set TB2 having the temporal continuity with the target information TB1.

Figure 14:
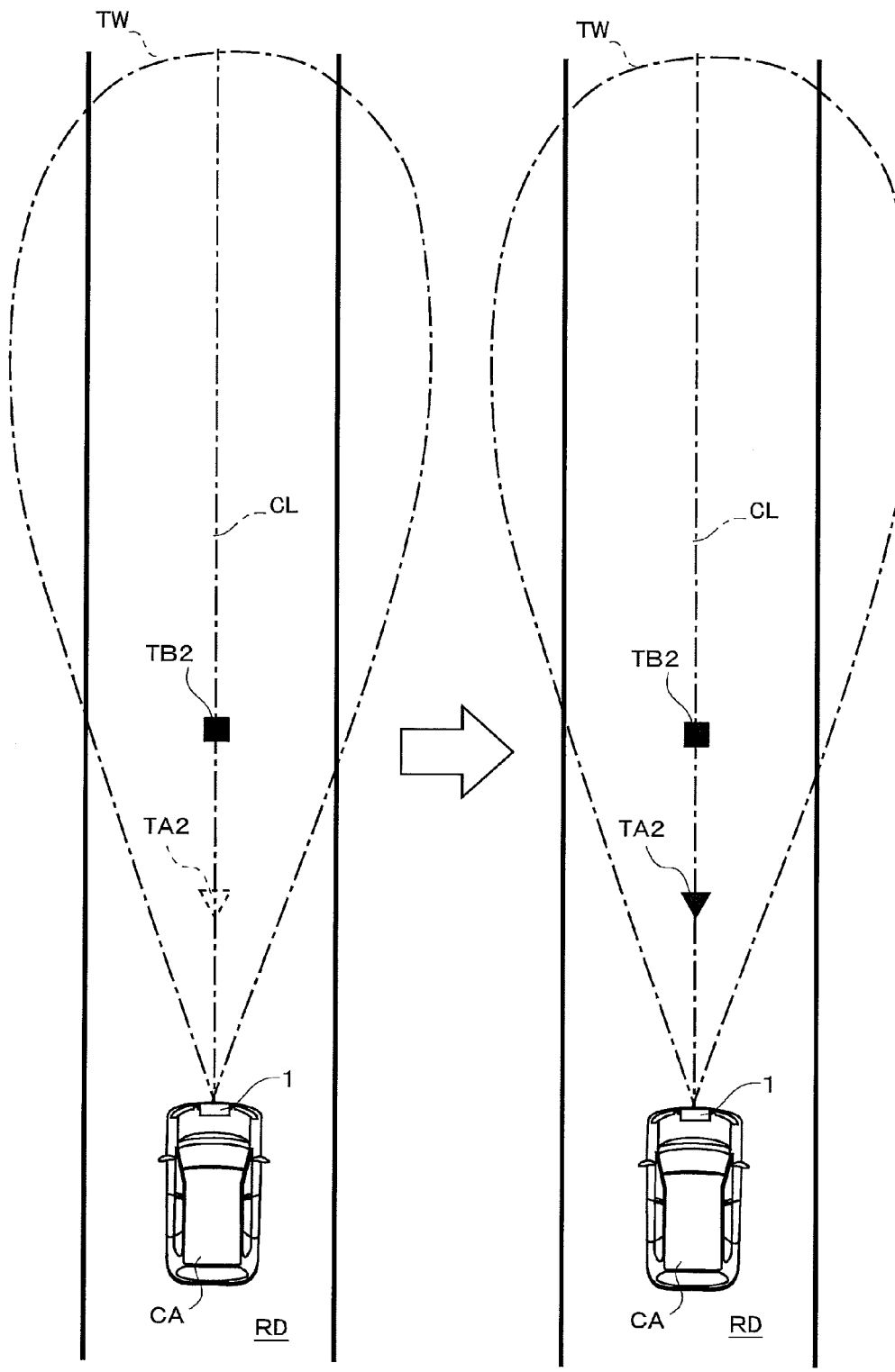
FIG. 14 illustrates generation of a prediction data set of a rear end portion data set of a preceding vehicle.

FIG. 14 illustrates the generation of the prediction data set of the rear end portion data set of the preceding vehicle 101. As shown in a left figure of FIG. 14, the rear end portion data set TA2 is not derived in the latest process and only the bottom portion data set TB2 is derived. In such a case, as shown in a right figure of FIG. 14, the position predicting part 72c generates the prediction data set of the rear end portion data set TA2 of the preceding vehicle 101, using the longitudinal distance difference and the bottom portion data set TB2. A value of the longitudinal distance that is one of the parameters of the prediction data set is calculated by subtracting the longitudinal distance difference from a value of the longitudinal distance of the bottom portion data set TB2. A lateral distance and a relative speed of the bottom portion data set TB2 are used for the prediction data set.

Here, in order to prevent an abnormal value of the longitudinal distance, a minimum value of the longitudinal distance of the prediction data set may be set to 0.5 m or greater. In a case where the rear end portion data set and the bottom portion data set are both derived, the longitudinal distance difference may be an average of longitudinal distance differences of a series of those data sets having the temporal continuity.

As described above, the radar apparatus 1 obtains beforehand a positional relationship between two pieces of the target information of targets that are associated with a same vehicle and that are located at different positions. Since the positional relationship between the two pieces of the target information is unchanged, even in a case where one of the two pieces of the target information is not derived, the radar apparatus 1 predicts an accurate position of the underived target information based on the positional information of the other pieces of the target information.

Thus, even in a case where the rear end portion data set is not derived due to the short distance between the host vehicle CA and the preceding vehicle 101, the radar apparatus 1 derives an accurate position of the rear end portion RA of the preceding vehicle 101. Moreover, the vehicle control apparatus 2 controls the host vehicle CA based on the rear end portion of the preceding vehicle 101, prevents a collision of the host vehicle CA with the preceding vehicle 101 and thus improves safety of a user in the vehicle.

With reference back to the step S108 of FIG. 7, in a case where the longitudinal distance of the bottom portion data set TB2 is 10 m or greater (No in the step S108), the target information processor 72 sets a value representing that the bottom portion data set TB2 is not associated with the rear end portion data set TA2 (a value representing that the association flag is off), to the target number of the bottom portion data set TB2 (a step S111).

In a case where the longitudinal distance of the bottom portion data set TB2 is 10 m or greater, as described above with reference to FIG. 8, the rear end portion RA is included in the transmission range of the transmission wave TW. As a result, the rear end portion data set TA2 is derived. In a case where the rear end portion data set TA2 is derived, the position predicting part 72c does not generate the prediction data set. Thus, the radar apparatus 1 more accurately derives a position of the rear end portion data set TA2 and also reduces the processing load of the radar apparatus 1.

<7-3. Effect of Generation of Prediction Data Set>

Figure 15:
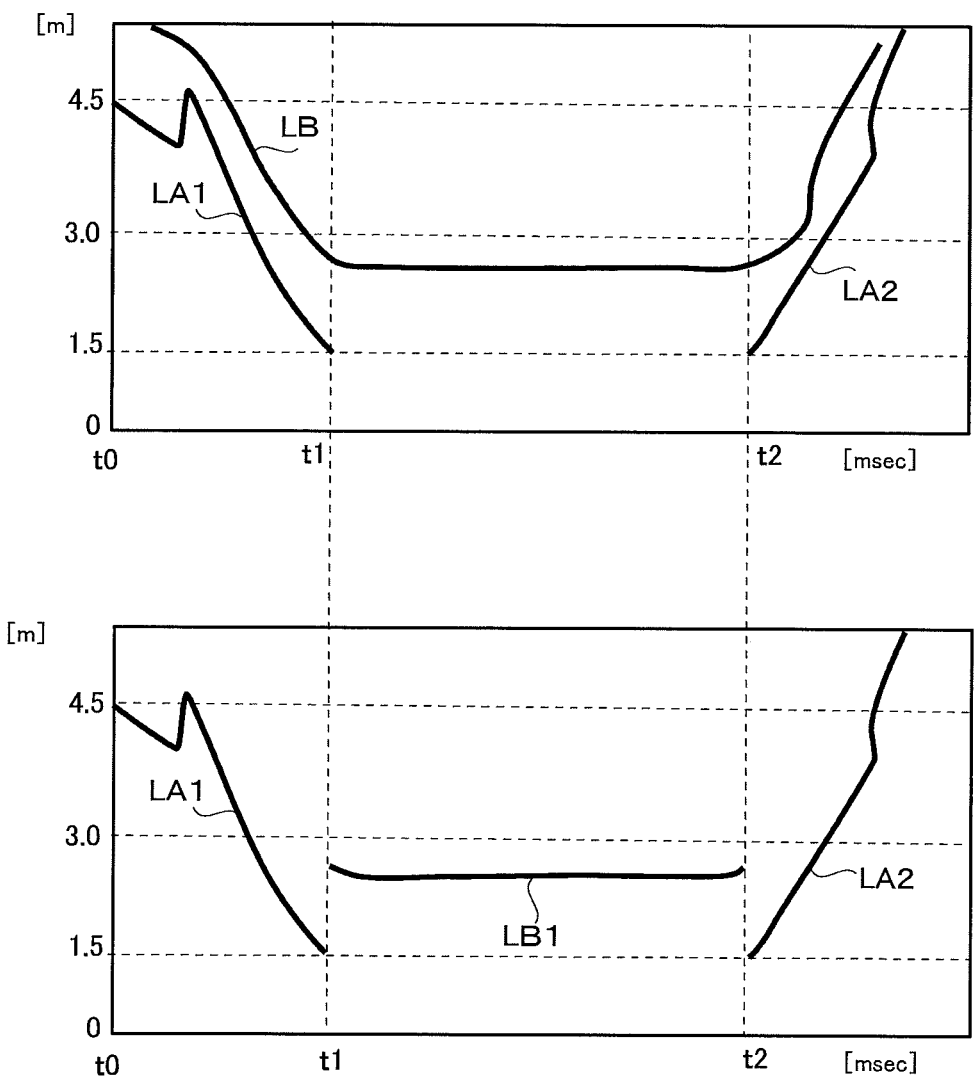
FIG. 15 illustrates derivation of a filter data set without use of a process that generates a prediction data set.
Figure 16:
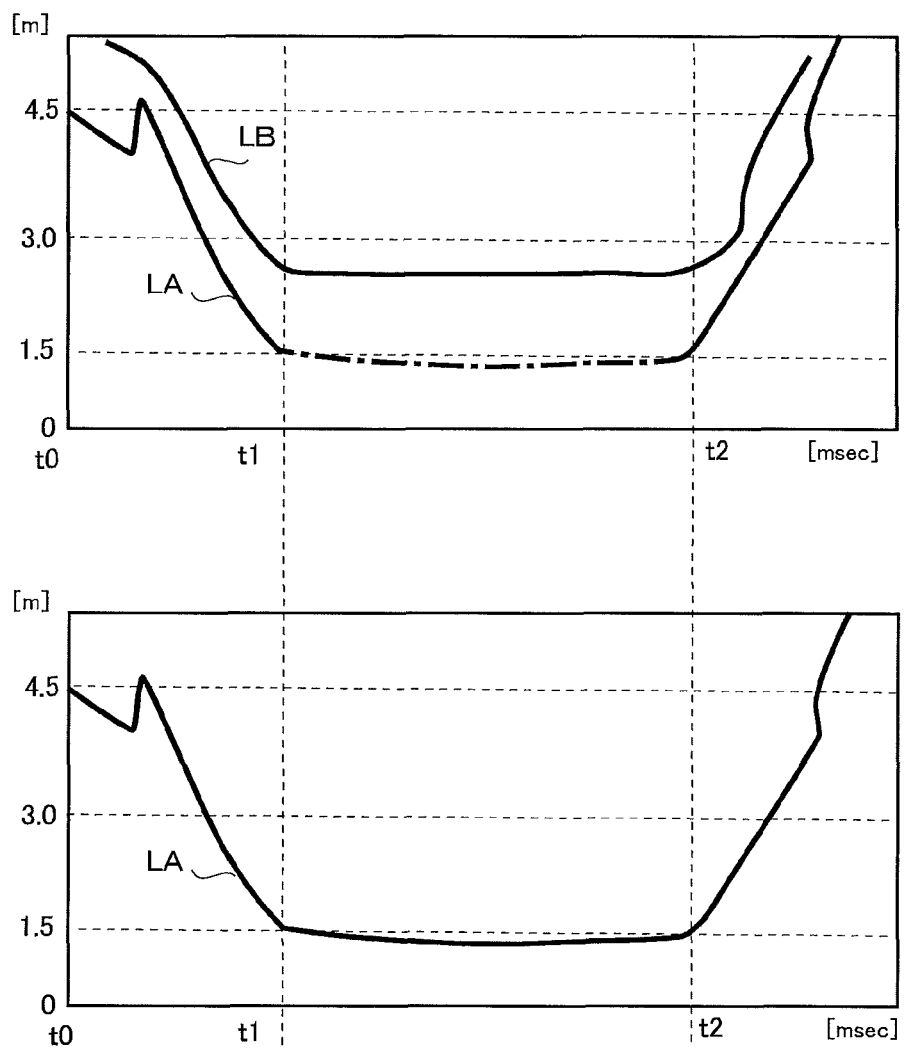
FIG. 16 illustrates derivation of a filter data set with use of the process that generates the prediction data set.

Next described is an effect of generating the prediction data set of the rear end portion data set TA2 based on the association between the rear end portion data set TA1 and the bottom portion data set TB1, with reference to FIGS. 15 and 16. FIG. 15 illustrates derivation (conventional) of a filter data set without use of a process that generates the prediction data set.

An upper graph of FIG. 15 illustrates the derivation of the filter data set before integration of target information. A lower graph of FIG. 15 illustrates the derivation of the filter data set after integration of the target information. A vertical axis and a horizontal axis of each of the graphs represent longitudinal distance (m) of the filter data set and time (msec) of the target information derivation process, respectively.

Shift lines LA1 and LA2 in solid lines in the upper graph of FIG. 15 show shift of the longitudinal distance of the filter data set (rear end portion data set TA) having a temporal continuity with the rear end portion data set TA1. A shift line LB in a solid line shows shift of the longitudinal distance of the filter data set (bottom portion data set TB) having a temporal continuity with the bottom portion data set TB1.

From a time point t0 to a time point t1, as a distance between the preceding vehicle 101 and the host vehicle CA gradually becomes smaller, a longitudinal distance of each of the two filter data sets becomes relatively small. Then from the time point t1 when the longitudinal distance of the rear end portion data set TA is approximately 1.5 m or smaller, to a time point t2, the rear end portion data set TA is not derived because the rear end portion RA comes out of the transmission range, and the rear end portion data set TA is not derived due to a short distance between the host vehicle CA and the preceding vehicle 101. Moreover, the bottom portion data set TB, as shown by the shift line LB, is derived in a position of approximately 2.5 m of the longitudinal distance and continues to be derived until the time point t2, keeping the temporal continuity.

Thus, from a time point t0 to a time point t1 of the lower graph of FIG. 15, as shown by the shift line LA1, the rear end portion data set TA is output to the vehicle control apparatus 2, as the target information associated with the preceding vehicle 101 due to the association of the rear end portion data set TA with the bottom portion data set TB, and the host vehicle is controlled based on the longitudinal distance of the rear end portion data set TA. However, from the time point t1 to a time point t2, as shown by the shift line LB1, the bottom portion data set TB is output to the vehicle control apparatus 2, as the target information of the preceding vehicle 101 and the host vehicle is controlled based on the longitudinal distance of the bottom portion data set TB.

The bottom portion BA of the preceding vehicle 101 is located in a position further than the rear end portion RA from the host vehicle CA. Therefore, if the vehicle control apparatus 2 controls the host vehicle CA in following control based on the position of the bottom portion BA, there is a possibility of a collision of the host vehicle CA with the preceding vehicle 101.

After the time point t2 in the upper and lower graphs of FIG. 15, the preceding vehicle 101 starts traveling from a stopped state. Thus, the longitudinal distance between the host vehicle CA and the preceding vehicle 101 becomes greater. Therefore, the rear end portion RA is included in the transmission range again, and thus the rear end portion data set TA is derived. As a result, as shown by the shift line LA2, the longitudinal distance of the rear end portion data set TA is derived and the vehicle control apparatus 2 controls the host vehicle CA based on the rear end portion data set TA.

FIG. 16 illustrates derivation (of this embodiment) of a filter data set with use of the process that generates the prediction data set. An upper graph of FIG. 16 illustrates the derivation of the filter data set before integration of target information. A lower graph of FIG. 16 illustrates the derivation of the filter data set after integration of the target information.

A shift line LA in a dashed-dotted line in the upper graph of FIG. 16 shows shift of a longitudinal distance of the rear end portion data set TA and a shift line LB in a solid line in the upper graph of FIG. 16 shows shift of the longitudinal distance of the bottom portion data set TB. A situation before a time point t1 of FIG. 16 is the same as the situation before the time point t1 explained with reference to FIG. 15.

The rear end portion data set is not derived from the time point t1 to a time point t2. However, the position predicting part 72c generates the prediction data set that is a data set predicting the rear end portion data set TA. Therefore, the longitudinal distance of the rear end portion data set TA is derived based on the prediction data set. Moreover, in the lower graph of FIG. 16, after the integration of the rear end portion data set TA and the bottom portion data set TB, as shown in the shift line LA, the rear end portion data set TA is output to the vehicle control apparatus 2 as the target information of the preceding vehicle 101.

Therefore, even in a case where the rear end portion data set TA is not derived from the time point t1 to the time point t2, the vehicle control apparatus 2 controls the host vehicle CA based on the prediction data set of the rear end portion data set TA. Moreover, the vehicle control apparatus 2 controls the host vehicle CA based on the actually-derived rear end portion data sets from the time point t0 to the time point t1 and after the time point t2. As a result, the vehicle control apparatus 2 controls the host vehicle in the following control based on the position of the rear end portion RA of the preceding vehicle 101 as the position of the preceding vehicle 101. Thus the vehicle control apparatus 2 reduces a possibility of a collision of the host vehicle CA with the preceding vehicle 101 and improves safety of a user in the vehicle.

8. Conclusion

As described above, in this embodiment, in the case where the target information derivation part 71 of the radar apparatus 1 derives the rear end portion data set TA and the bottom portion data set TB of the preceding vehicle 101, the association part 72a associates beforehand the bottom portion data set TB with the rear end portion data set TA. Then the distance difference calculator 72b calculates a longitudinal distance difference between the two data sets. Next, in case where (1) the host vehicle CA and the preceding vehicle 101 are in a short distance, (2) the rear end portion RA of the preceding vehicle 101 is out of the transmission range of the radar apparatus 1 and (3) the rear end portion data set TA is not derived, the position predicting part 72c generates the prediction data set of the rear end portion data set TA, using the position of the bottom portion data set TB and the longitudinal distance difference between the two data sets. Thus, the radar apparatus 1 predicts an accurate position of the rear end portion data set TA of the preceding vehicle 101 that actually exists but that is not derived. Moreover, the vehicle control apparatus 2 controls the host vehicle CA based on the rear end portion RA of the preceding vehicle 101, prevents a collision of the host vehicle CA with the preceding vehicle 101 and thus improves safety of a user in the vehicle.

Moreover, in a case where the longitudinal distance of the bottom portion data set TB becomes the predetermined distance or greater because the preceding vehicle 101 starts traveling from the stopped state, the rear end portion data set TA is included in the transmission range again and thus the position predicting part 72c does not generate the prediction data set of the rear end portion data set TA. Thus, the radar apparatus 1 more accurately derives a position of the rear end portion data set based on the actually-derived rear end portion data set TA and reduces the processing load of the radar apparatus 1.

9. Modifications

The embodiment of the invention is described above. However, the invention is not limited to the foregoing embodiment but various modifications are possible. Such modifications will be described below. Any form of the foregoing embodiment and the modifications described below may be arbitrarily combined with another.

In the foregoing embodiment, in the case where the longitudinal distance of the bottom portion data set TB2 is at or greater than the predetermined distance (e.g. 10 m) (No in the step S108), the target information processor 72 sets the value representing that the bottom portion data set is not associated with the rear end portion data set (the value representing that the association flag is off), to the target number of the bottom portion data set TB2 (the step S111). In addition, in a case where the rear end portion data set TA2 is actually derived in a close vicinity of a generated prediction data set, the target information processor 72 may also set the value representing that the association flag is off, to the target number of the bottom portion data set TB2. Thus, the radar apparatus 1 can surely determine an appropriate timing when the radar apparatus 1 does not generate the prediction data set.

Moreover, in the foregoing embodiment, the determination processes are described based on the conditions using the concrete values including the longitudinal distance. However, those values may be different values that fulfill a purpose of each of the conditions.

In the foregoing embodiment, a number of the transmission antenna 40 of the radar apparatus 1 is one and a number of the receiving antennas 51 of the radar apparatus 1 is four. However, the numbers of the transmission antenna 40 and the receiving antennas 51 of the radar apparatus 1 are examples and if target information of plural targets can be derived, those numbers may be different numbers.

In the foregoing embodiment, the radar apparatus 1 is mounted on the front portion (e.g. in the front grill) of the host vehicle. However, if the radar apparatus 1 can transmit a transmission wave to an outside of the host vehicle, the radar apparatus 1 may be mounted on/in at least one of a rear portion (e.g. a rear bumper), a left portion (e.g. left door mirror), and a right portion (e.g. right door mirror) of the host vehicle.

Any of electronic waves, ultrasonic waves, lights, laser and other methods that can derive target information of a target may be used to transmit a transmission wave from a transmission antenna.

The radar apparatus 1 may be used for purposes other than a vehicle. For example, the radar apparatus 1 may be used for airplanes, ships, boats and others.

In the foregoing embodiment, various functions are implemented by software based on an arithmetic process of the CPU executing a program. However, a part of the functions may be implemented by an electric hardware circuit. Contrarily, functions that are implemented by a hardware circuit in the foregoing embodiment may be implemented by software.

While the invention has been shown and described in detail, the foregoing description is in all aspects illustrative and not restrictive. It is therefore understood that numerous other modifications and variations can be devised without departing from the scope of the invention.

What is claimed is:

1. A radar apparatus that receives a reflection wave reflected by a target existing in a transmission range of a transmission wave and that derives target information of the target, the radar apparatus comprising a signal processor configured to:
- derive (i) first target information of a first target existing in the transmission range of the transmission wave, the first target being a rear end portion of a vehicle and (ii) second target information of a second target existing in the transmission range of the transmission wave, the second target being a portion of the vehicle other than the rear end portion of the vehicle;
- calculate a distance difference between the first target and the second target; and
- predict, in a case where the first target information of the first target derived in a previous target information derivation process is not derived in a latest target information derivation process, a position of the first target, using the distance difference and the second target information of the second target derived in the latest target information derivation process.

2. The radar apparatus according to claim 1, wherein
in a case where a speed of a host vehicle having the radar apparatus is at or less than a predetermined speed, the signal processor associates the first target information of the first target with the second target information of the second target, and
after associating the first target information of the first target with the second target information of the second target, the signal processor predicts the position of the first target.

3. The radar apparatus according to claim 1, wherein
in a case where a distance of the second target to a host vehicle having the radar apparatus is at or greater than a predetermined distance, the signal processor does not predict the position of the first target.

4. The radar apparatus according to claim 1, wherein
in a case where the first target information of the first target is derived in a subsequent target information derivation process after the signal processor has predicted the position of the first target, the signal processor does not predict the position of the first target.

5. A vehicle control system comprising:
a radar apparatus according to claim 1; and
a vehicle control apparatus that controls a host vehicle having the radar apparatus based on the predicted position of the first target.

6. A signal processing method executed by a signal processor of a radar apparatus that receives a reflection wave reflected by a target existing in a transmission range of a transmission wave and that derives target information of the target, the signal processing method comprising the steps of:
(a) deriving (i) first target information of a first target existing in the transmission range of the transmission wave, the first target being a rear end portion of a vehicle and (ii) second target information of a second target existing in the transmission range of the transmission wave, the second target being a portion of the vehicle other than the rear end portion of the vehicle;
(b) calculating a distance difference between the first target and the second target; and
(c) predicting, in a case where the first target information of the first target derived in a previous target information derivation process is not derived in a latest target information derivation process, a position of the first target, using the distance difference and the second target information of the second target derived in the latest target information derivation process.

7. The signal processing method according to claim 6, further comprising the step of:
in a case where a speed of a host vehicle having the radar apparatus is at or less than a predetermined speed, (d) associating the first target information of the first target with the second target information of the second target, and wherein
after associating the first target information of the first target with the second target information of the second target, the step (c) predicts the position of the first target.

8. The signal processing method according to claim 6, wherein
in a case where a distance of the second target to a host vehicle having the radar apparatus is at or greater than a predetermined distance, the step (c) does not predict the position of the first target.

9. The signal processing method according to claim 6, wherein
in a case where the first target information of the first target is derived in a subsequent target information derivation process after the signal processor has predicted the position of the first target, the step (c) does not predict the position of the first target.

* * * * *